Dec. 11, 1928.

N. LE VAN

CLUTCH

Filed Oct. 11, 1926    3 Sheets-Sheet 1

1,695,150

INVENTOR
Nelson LeVan
BY Victor J. Evans
ATTORNEY

WITNESS: J.T.L. Wright

Dec. 11, 1928.　　　　　　　　　　1,695,150
N. LE VAN
CLUTCH
Filed Oct. 11, 1926　　　3 Sheets-Sheet 2

Nelson LeVan
INVENTOR

BY Victor J. Evans
ATTORNEY

WITNESS:

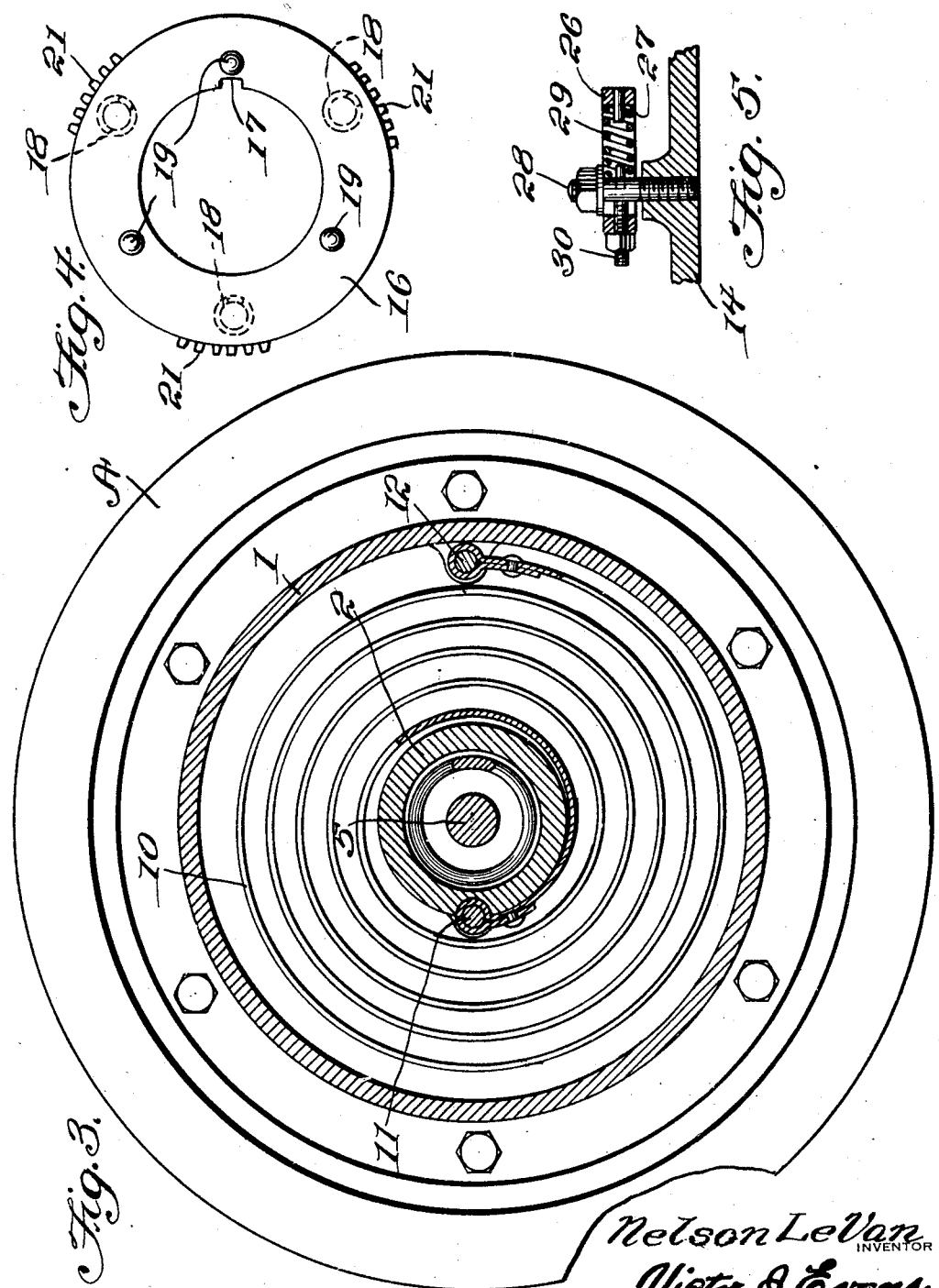

Patented Dec. 11, 1928.

1,695,150

UNITED STATES PATENT OFFICE.

NELSON LE VAN, OF BATTLE CREEK, MICHIGAN.

CLUTCH.

Application filed October 11, 1926. Serial No. 140,971.

This invention relates to an improved clutch for motor vehicles, the general object of the invention being to provide a coiled spring for connecting the drive part to the driven part so that the load will be gradually taken up by the motor, due to the winding up of the spring by the initial movement of the motor.

A further object of the invention is to provide means for preventing breakage or damage to the spring when the momentum of the car is greater than the engine, which would act to unwind the spring and damage the same.

A still further object of the invention is to provide manually operated means for moving the clutch structure to free it of the fly wheel of the motor so that the spring can unwind itself, with brake means for preventing the spring from unwinding too fast.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a section on line 3—3 of Figure 1.

Figure 4 is a view of the gear.

Figure 5 is a section on line 5—5 of Figure 2.

Figure 1:
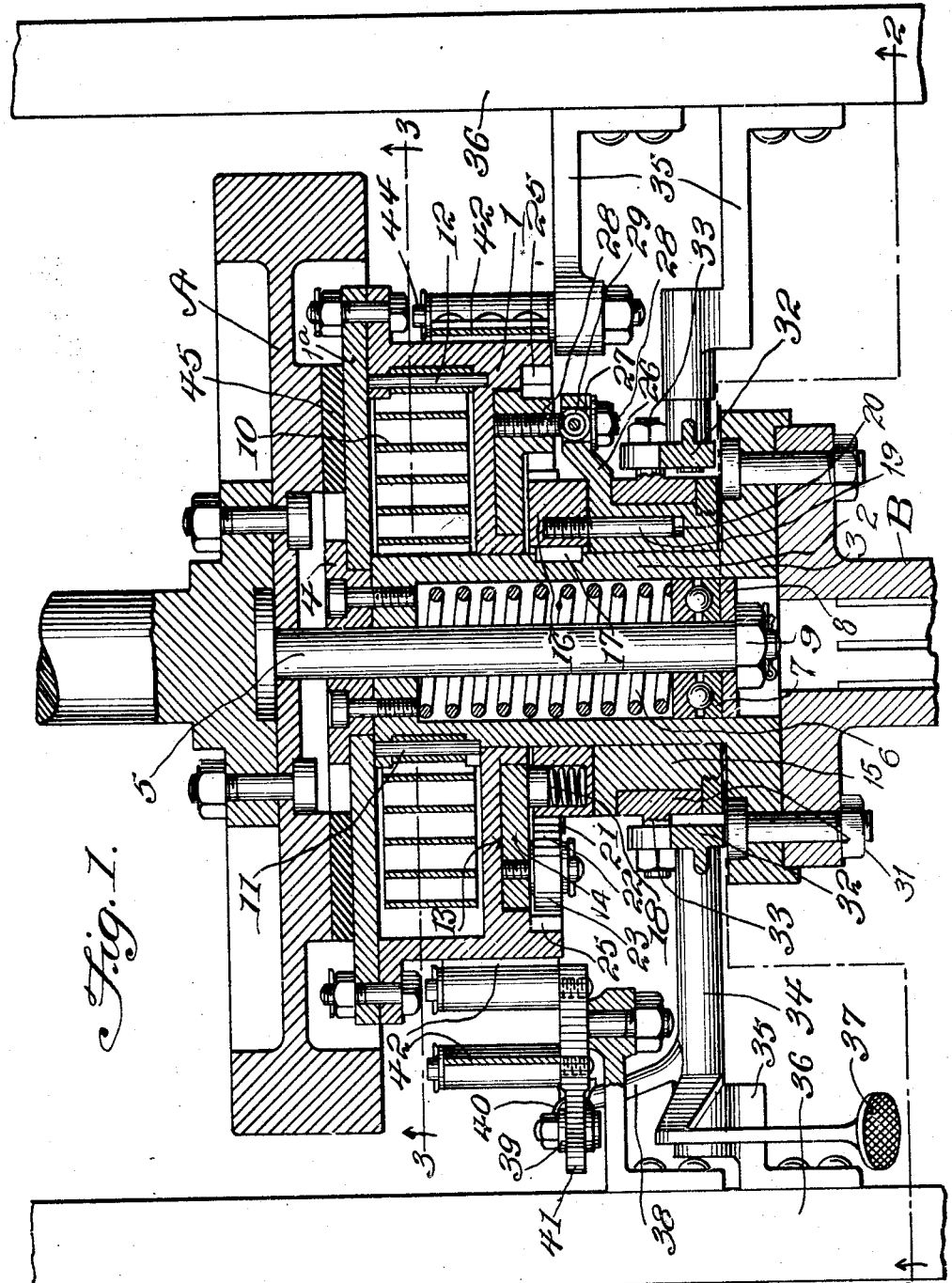
Figure 1 is a plan view of portion of the chassis, with parts of the clutch shown in section.
Figure 2:
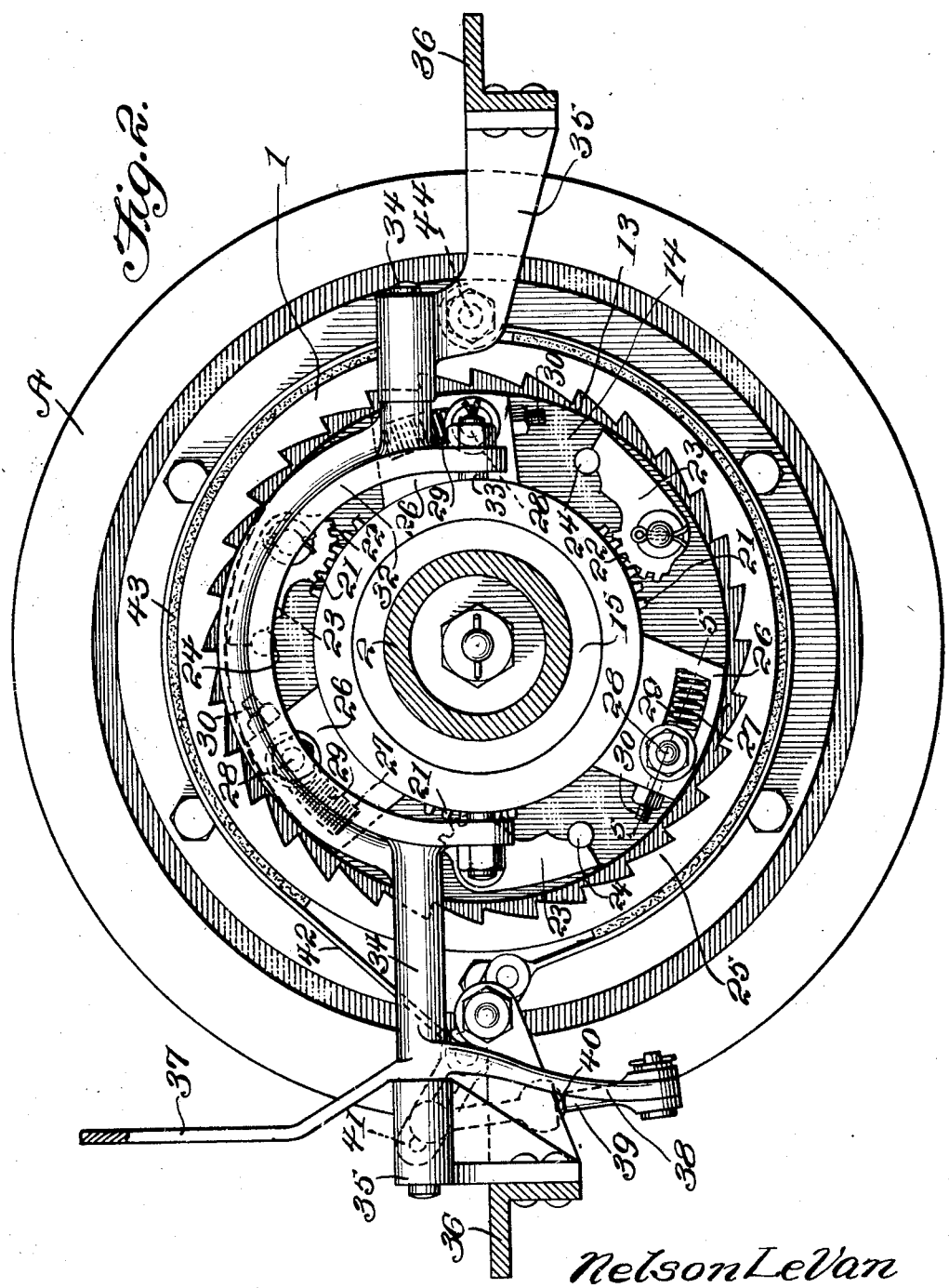
Figure 2 is a section on line 2—2 of Figure 1.

In these drawings, 1 indicates a spring drum which is rotatably mounted on the hub 2 which has a collar 3 at its outer end which is adapted to be fastened to a movable part B of the transmission means. The inner end of the hub has a flanged plate 4 bolted thereto, this plate rotatably connecting the cover plate of the drum to the hub so that the drum will move with the hub. A spindle 5 passes through a hole formed in the center of the fly wheel A of the motor and through holes formed in the plate 4 and the inner end of the hub and has its outer end resting in a hole formed in the collar 3. A helical spring 6 is placed in the hub and encircles the spindle, the outer end of the spring engaging a ball bearing 7 which is held on the spindle by the washer 8 and the nut 9, the purpose of which is to press the hub and the drum through its cover 1ª toward the end of the fly wheel A.

A coiled spring 10 is arranged in the drum and has one end connected with the hub, as shown at 11, and its other end connected with the drum, as shown at 12. The drum has an annular recess 13 in its outer face which receives a friction ring 14. A grooved collar 15 is rotatably mounted on the hub and a gear 16 is keyed to the hub, as at 17, and is arranged between the collar 15 and the friction plate. This gear carries the spring plungers 18 for engaging the friction plate to hold the same against the bottom of the recess in the drum and said gear also carries the pins 19 which engage the guiding sockets 20 in the collar 15. The gear is provided with spaced groups of teeth 21, each group of teeth engaging the teeth 22 on a latch 23 carried by the friction ring 14 which also carries a stop pin 24 adjacent each latch and adapted to cooperate therewith as follows: When the gear is moved, it will swing the latches outwardly so that they will engage the ratchet ring 25 formed on the spring drum, which will lock the parts together. The collar 15 carries a number of arms 26, each of which is provided with a slot 27 for receiving a pin 28 carried by the friction ring 14. A helical spring 29 is arranged in each slot and tends to hold the collar and gear yieldably in a position with the latches 23 engaging the stop pins 24, so that the said latches will normally be held in inoperative position. Each arm also carries an adjusting screw 30 which bears against the pin 28 for adjusting the tension of the spring.

A clutch ring 31 is located in the groove of the collar 15 and a yoke 32 engages the trunnions 33 of the said ring. The shafts 34 of the yoke are journaled in the brackets 35 which are fastened to the side pieces 36 of the chassis of the vehicle. A pedal 37 is connected with one of the shafts and a depending arm 38 is also connected to said shaft. This arm is connected by the links 39 which are connected by a universal joint 40 with a lever 41 of a brake band 42 which surrounds the drum 1. The band is provided with the usual lining 43 and it is fastened to a part of one of the brackets 35, as shown at 44.

The drawings show a ring 45 of friction material, placed on the fly wheel and adapted to be engaged by the cover 1ᵃ of the spring drum when the clutch is in operative position so that the clutch assembly will be frictionally connected with the fly wheel.

From the foregoing, it will be seen that with the clutch in its normal operative position, the initial movement of the fly wheel will cause the drum 1 to rotate on the hub, thus winding up the spring 10. As soon as the spring has been sufficiently wound so that its tension is greater than the load, then the hub will begin to rotate and thus the power will be applied to the transmission means so that the load is gradually picked up by the engine. If the momentum of the vehicle is greater than the speed of the engine, say when the vehicle is running down hill, the hub 2 will be traveling at a greater speed than the drum 1 and thus the spring would be unwound and damaged. This is prevented by the movement of latches 23 into engagement with the ratchet ring 25 on the drum when the hub moves faster than the drum, as this movement of the hub is communicated to the gear 16, the teeth of which acting on the teeth of the latches 23, will cause the latches to move outwardly and engage the teeth of the ring 25 so that the parts are locked together and the hub cannot move any faster than the drum and the spring cannot be unwound. As soon as the speed of the hub 2 slackens, the springs 29 will cause the parts to assume their normal position and return the latches 23 to their inoperative positions.

When the vehicle is to be stopped, the clutch pedal 37 is depressed, which will cause the yoke 32 to shift the collar 15 outwardly away from the fly wheel, carrying the hub with it. This will remove the tension from the plungers 18 and remove the friction of the ring 14 from the drum. It also compresses the spring 6 and spaces the drum from the friction ring 45 on the fly wheel, and as the said drum is free of the friction exerted by the ring 14, it can rotate under the tension of the spring 10 and thus permit the said spring to unwind itself. By depressing the pedal lever a little further, the brake band 42 can be tightened upon the drum to prevent the spring from unwinding too fast.

This invention will enable the engine to gradually pick up its load without the driver using his clutch, and it is possible with this invention to start the vehicle with the shifting lever in the high speed position on level ground, as the spring will gradually connect the engine with the load. The invention also makes it easier for a beginner to handle a car and it prevents breakage of gear teeth.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a drive member and a driven member, a flexible clutch between the two members comprising a spring drum, a hub on which the drum is rotatably mounted, means for causing the drum to move with the hub when the said hub is moved longitudinally, a coiled spring in the drum having one end connected with the drum and the other end with the hub, spring means for holding the hub and drum in a position where they will engage the drive member, means for connecting the hub to the driven member, means for shifting the parts out of engagement with the drive member, friction means associated with the hub and engaging the drum, means for rendering said means inactive when the hub is shifted to release the parts from the drive member and means for locking the hub and drum together if the driven member should rotate faster than the drive member.

2. In combination with a drive member and a driven member, a flexible clutch between the two members comprising a spring drum, a hub on which the drum is rotatably mounted, means for causing the drum to move with the hub when the said hub is moved longitudinally, a coiled spring in the drum having one end connected with the drum and the other end with the hub, spring means for holding the hub and drum in a position where they will engage the drive member, means for connecting the hub to the driven member, means for shifting the parts out of engagement with the drive member, friction means associated with the hub and engaging the drum, means for rendering said means inactive when the hub is shifted to release the parts from the drive member, means for locking the hub and drum together if the driven member should rotate faster than the drive member and brake means for the drum to prevent the spring unwinding too fast when the friction means are rendered inoperative.

3. In combination with a drive member and a driven member, a flexible clutch between the two members comprising a hub movably arranged between the two members, a spring drum rotatably mounted on the hub and movable therewith, a coiled spring connecting the drum with the hub, a spring in the hub for holding the parts in engagement with the drive member, means for connecting the hub with the driven member, a friction ring associated with the drum, a clutch collar on the drum, arms on the collar, means for connecting the arms with the friction ring, a gear keyed to the hub, latch levers carried by the friction ring and having teeth engaging the gear, ratchet teeth on the drum with which the latch levers will engage when the gear and hub are rotated in relation to the drum, spring means for holding the gear with the latch levers in inoperative position, manually operated means associated with the clutch collar for shifting the parts to release the clutch from the drive member, this movement also moving the friction ring from the drum so that the drum can rotate and thus permit the spring to unwind itself and brake means associated with the manually operated means and engaging the drum for preventing the spring from unwinding too fast.

In testimony whereof I affix my signature.

NELSON LE VAN.